United States Patent
Kim

(10) Patent No.: US 6,646,685 B1
(45) Date of Patent: Nov. 11, 2003

(54) METHOD FOR CONTROLLING ON-SCREEN DISPLAY OPERATION OF DISPLAY APPARATUS WITH AUXILIARY INPUT/OUTPUT TERMINAL

(75) Inventor: Young Chan Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/087,829

(22) Filed: Jun. 1, 1998

(30) Foreign Application Priority Data

May 31, 1997 (KR) ............................................. 97-22632

(51) Int. Cl.⁷ ................................................ H04N 5/50
(52) U.S. Cl. ........................ 348/569; 348/563; 348/552; 348/180; 348/184; 348/570; 345/150
(58) Field of Search ................................ 348/563, 564, 348/569, 570, 552, 553, 177, 178, 180, 184; 345/150, 902, 3.1, 1.2; H04N 5/50

(56) References Cited

U.S. PATENT DOCUMENTS

| | | | | |
|---|---|---|---|---|
| 4,757,239 A | * | 7/1988 | Starkey, IV | 315/371 |
| 4,772,948 A | * | 9/1988 | Irvin | 324/121 R |
| 5,287,172 A | | 2/1994 | Lee | 348/518 |
| 5,325,196 A | * | 6/1994 | Yoshimi et al. | 348/180 |
| 5,457,473 A | * | 10/1995 | Arai et al. | 345/10 |
| 5,493,340 A | | 2/1996 | Kim | 348/569 |
| 5,532,719 A | | 7/1996 | Kikinis | 345/211 |
| 5,550,556 A | | 8/1996 | Wu et al. | 345/14 |
| 5,670,972 A | * | 9/1997 | Kim | 345/12 |
| 5,703,661 A | * | 12/1997 | Wu | 345/212 |
| 5,790,189 A | * | 8/1998 | Moon | 348/189 |
| 5,828,351 A | * | 10/1998 | Wu | 345/11 |
| 5,862,203 A | * | 1/1999 | Wulkan et al. | 379/114.01 |
| 5,943,092 A | * | 8/1999 | Chuang et al. | 348/177 |
| 5,956,022 A | * | 9/1999 | Cheng | 345/213 |
| 5,959,686 A | * | 9/1999 | Jeong | 345/1.3 |
| 5,963,249 A | * | 10/1999 | Kim | 348/178 |
| 5,963,266 A | * | 10/1999 | Fujimori | 348/511 |
| 5,986,638 A | * | 11/1999 | Cheng | 345/184 |
| 5,995,162 A | * | 11/1999 | Fujimori | 348/569 |
| 6,002,449 A | * | 12/1999 | Tsyrganovich | 348/725 |
| 6,011,539 A | * | 1/2000 | Hamilton et al. | 345/141 |
| 6,069,619 A | * | 5/2000 | Kim | 345/211 |
| 6,072,541 A | * | 6/2000 | Song | 348/706 |
| 6,085,326 A | * | 7/2000 | Kim | 713/300 |
| 6,091,397 A | * | 7/2000 | Lee | 345/20 |
| 6,097,437 A | * | 8/2000 | Hwang | 348/441 |
| 6,100,886 A | * | 8/2000 | Lin | 345/10 |
| 6,104,360 A | * | 8/2000 | Kim | 345/11 |
| 6,115,079 A | * | 9/2000 | McRae | 348/731 |
| 6,122,018 A | * | 9/2000 | Sugihara et al. | 348/705 |
| 6,134,575 A | * | 10/2000 | Lee | 345/156 |
| 6,166,778 A | * | 12/2000 | Yamamoto et al. | 348/569 |
| 6,175,356 B1 | * | 1/2001 | Jung | 345/158 |
| 6,211,922 B1 | * | 4/2001 | Jun | 348/569 |
| 6,215,467 B1 | * | 4/2001 | Suga et al. | 345/132 |
| 6,229,524 B1 | * | 5/2001 | Chernock et al. | 345/157 |
| 6,259,484 B1 | * | 7/2001 | Jiang et al. | 348/511 |
| 6,266,097 B1 | * | 7/2001 | Jiang et al. | 348/511 |

(List continued on next page.)

Primary Examiner—Sherrie Hsia
(74) Attorney, Agent, or Firm—Robert E. Bushnell, Esq.

(57) ABSTRACT

A method for controlling an on-screen display operation of a display apparatus with an auxiliary input/output terminal. If a key control signal is input through a self key input unit or if an auxiliary control signal is input through the auxiliary input/output terminal, an on-screen display signal is output to a screen and a control function corresponding to the input key control signal or the input auxiliary control signal is performed. When the display apparatus is controlled in response to a control signal which is applied to the auxiliary input/output terminal through a USB unit, as well as a control signal which is applied through a self key input unit, the controlled operating state is displayed on the screen in an OSD manner. Therefore, the user can immediately check the current state of the display apparatus.

18 Claims, 2 Drawing Sheets

U.S. PATENT DOCUMENTS 6,289,466 B1 * 9/2001 Bayramoglu et al. .......... 710/10
6,300,980 B1 * 10/2001 McGraw et al. ............ 348/180
6,313,873 B1 * 11/2001 Lee ............................ 348/177
6,314,479 B1 * 11/2001 Frederick et al. ........... 709/208
6,320,576 B1 * 11/2001 Kim ............................ 345/157
6,326,996 B1 * 12/2001 Brabander ................... 348/180
6,348,952 B1 * 2/2002 Jeong ......................... 348/563
6,366,289 B1 * 4/2002 Johns ......................... 345/543

* cited by examiner

METHOD FOR CONTROLLING ON-SCREEN DISPLAY OPERATION OF DISPLAY APPARATUS WITH AUXILIARY INPUT/OUTPUT TERMINAL

CLAIM FOR PRIORITY

This application makes reference to, incorporates the same herein, and claims all benefits accruing under 35 U.S.C. §119 from an application for METHOD FOR CONTROLLING ON-SCREEN DISPLAY OPERATION OF DISPLAY APPARATUS WITH AUXILIARY INPUT/OUTPUT TERMINAL earlier filed in the Korean Industrial Property Office on the 31$^{st}$ of May 1997, and there duly assigned Ser. No. 22632/1996, a copy of which application is annexed hereto.

BACKGROUND OF THE INVENTION

1. Technical Field

The present invention relates to a display apparatus with an auxiliary input/output terminal, and more particularly, to a method for controlling an on-screen display (OSD) operation of a display apparatus with an auxiliary input/output terminal in response to a self key input signal from a key input unit installed thereon and an auxiliary input signal from a computer system.

2. Related Art

Recent computer systems have become more powerful in terms of processing speed and available functions. Universal serial bus (USB) unit has been developed to extend the number of peripheral devices connected to the computer system, such as a modem, an audio card, a scanner and a game machine, and to provide a standard for the signal transfer among the peripheral devices.

Generally, USB unit is adapted to perform an up stream data communication and a down stream data process. For example, when information data is received from a central processing unit (CPU) of the computer system, the USB unit transfers the received data down stream to designated peripheral devices. Likewise, upon receipt of data from the peripheral devices, the USB unit transfers the received data up stream to the central processing unit (CPU) of the computer system. Such a signal transfer of the USB unit may be applied to a display apparatus such as a cathode-ray tube (CRT) monitor which is a peripheral device used to process information data received from the central processing unit (CPU) of the computer system and provide a visual display of information data on a screen.

Typical display apparatus has built-in control inputs known as a self key input unit mounted thereon for user adjustments of display parameters such as contrast, brightness, picture position. Some display apparatuses such as disclosed in U.S. Pat. No. 5,550,556 for Transmitting Data And Commands To Display Monitors issued to Wu et al., U.S. Pat. No. 5,532,719 for Remote Control Of Display Functions issued to Kikinis, and U.S. Pat. No. 5,457,473 for Image Display Apparatus issued to Arai et al., permit display parameter adjustment directly from a computer system. Many contemporary display apparatuses also use an auxiliary input/output terminal to perform display control functions such as contrast, brightness and picture position adjustment in response to a control signal from the computer system through an universal serial bus (USB) unit. Generally, an operating state of the display apparatus which is controlled in response to the control signal from the self key input unit may be displayed on a screen in an on-screen display (OSD) manner as described, for example, in U.S. Pat. No. 5,287,172 for Automatic On-Screen Color Converting Circuit For A Color Television issued to Lee, U.S. Pat. No. 5,493,317 for On-Screen Display Device For A Multimode Monitor And Method Thereof issued to Kim, and U.S. Pat. No. 5,493,340 for Circuit For Displaying Screen Control States Of A Monitor issued to Kim. However, I have observed that the operating state of the display apparatus which is controlled in response to the control signal from an auxiliary input/output terminal may not be displayed on the screen, and only the corresponding function is performed. For this reason, when the display apparatus is controlled in response to the control signal from the self key input unit, the controlled operating state is displayed on the screen in the OSD manner for the user confirmation and convenience. However, the user cannot immediately check the operating state of the display apparatus when the display apparatus is externally controlled through the USB unit installed in the computer system.

SUMMARY OF THE INVENTION

Accordingly, it is therefore an object of the present invention to provide a display apparatus with improved on-screen display of display parameters in response to control signals from both a self key input unit installed thereon and an universal serial bus (USB) unit installed in a computer system.

It is also an object to provide a method for controlling an on-screen display (OSD) of a display apparatus with an auxiliary input/output terminal in response to a self key input signal from a key input unit installed thereon and an auxiliary input signal from a computer system These and other objects of the present invention can be achieved by a method for controlling an on-screen display operation of a display apparatus with an auxiliary input/output terminal which comprises the steps of: providing a visual display of a desired video image on a monitor; determining whether a key control signal is input through a key input unit installed on the monitor for adjustment of display parameters of the desired video image displayed on the monitor; when no key control signal is input through the key input unit, determining whether an auxiliary control signal is input through the auxiliary input/output terminal; when the auxiliary control signal is input through the auxiliary input/output terminal, determining whether the input auxiliary control signal is to be transferred to the monitor for adjustment of the display parameters of the desired video image displayed on the monitor; and providing an on-screen display of an operating state of display parameters on the monitor, and executing display parameter adjustments of the desired video image displayed on said monitor in accordance with one of the input key control signal and the input auxiliary control signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
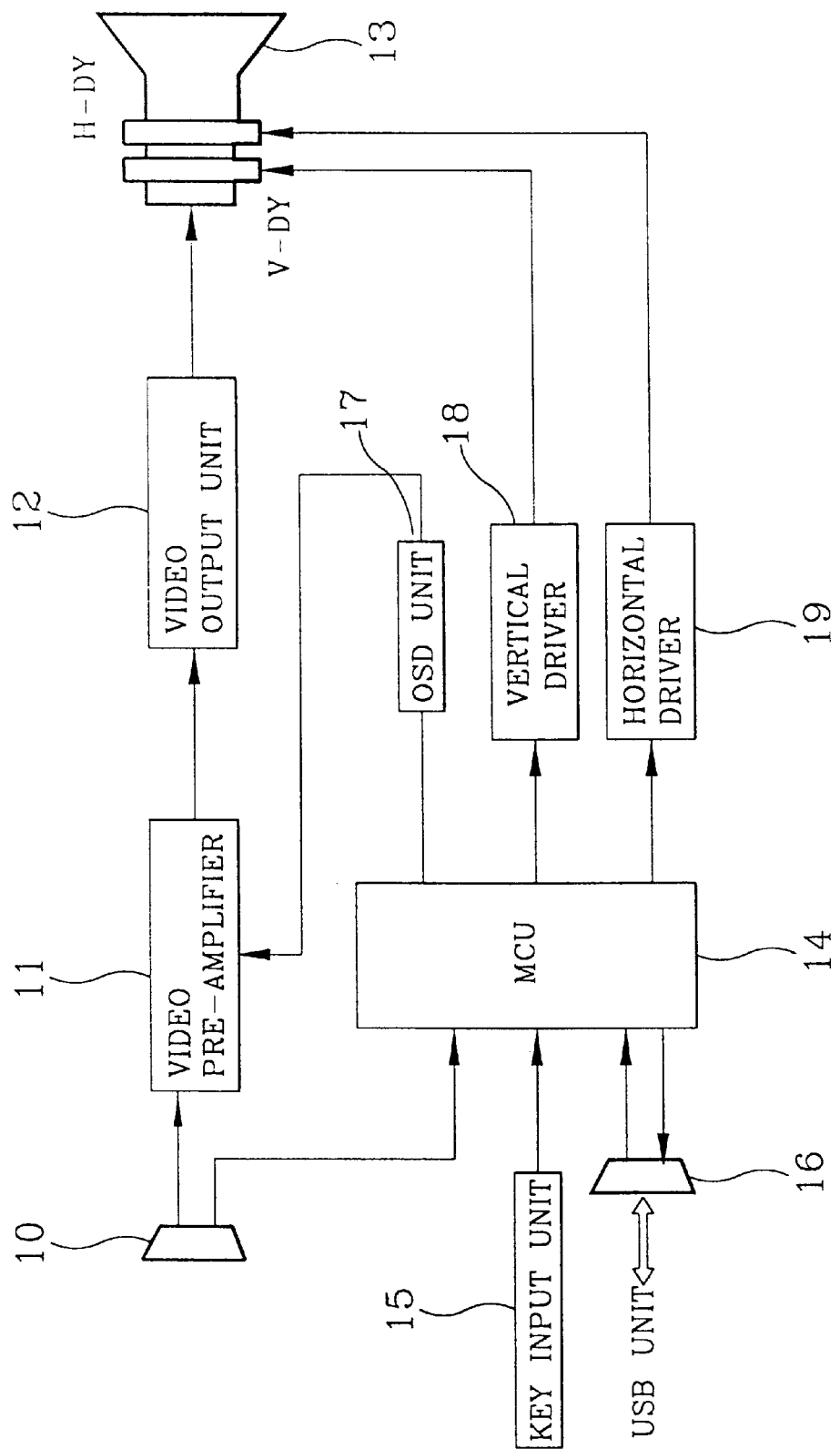
FIG. 1 illustrates a display apparatus with an auxiliary input/output terminal constructed according to the principles of the present invention.

Referring now to the drawings and particularly to FIG. 1, which illustrates a display apparatus with an auxiliary input/output terminal according to the principles of the present invention. As shown in FIG. 1, the display apparatus comprises a video input terminal 10 for receiving a video signal and vertical and horizontal synchronous signals from a host computer (not shown), a video pre-amplifier 11 for amplifying the video signal from the video input terminal 10 by a predetermined level, and a video output unit 12 for outputting a desired video image to a cathode ray tube (CRT) monitor 13 in response to an output video signal from the video pre-amplifier 12.

A micro-controller unit (MCU) 14 applies the vertical and horizontal synchronous signals from the video input terminal 10 to vertical and horizontal drivers 18 and 19, respectively. A key input unit 15 is installed on the CRT monitor 13 to allow the user to manually adjust the display parameters of a video image displayed on the CRT monitor 13 such as contrast, brightness, picture position, and generate therefrom a key control signal to the MCU 14. The key control signal represents a display request to adjust various display parameters such as a display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain.

An auxiliary input/output terminal 16 is installed in the display apparatus and is connected to an universal serial bus (USB) unit installed in the host computer (not shown) to apply an auxiliary control signal from the host computer via the USB unit to the MCU to control the display parameters of the video image displayed on the CRT monitor 13. Likewise, the auxiliary control signal also represents a display request to adjust various display parameters such as a display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain. The MCU 14 then controls the entire operation of the display apparatus in response to the control signal from either the key input unit 15 or the auxiliary input/output terminal 16.

An on-screen display (OSD) unit 17 applies an output signal from the MCU 14 to the video pre-amplifier 11 to display an operating state controlled by the MCU 14 on the CRT monitor 13. Vertical and horizontal deflection yokes V-DY and H-DY are provided in the CRT 13 to perform vertical and horizontal deflections of a video to be displayed on the CRT monitor 13, respectively, in response to control signals from the vertical and horizontal drivers 19.

Figure 2:
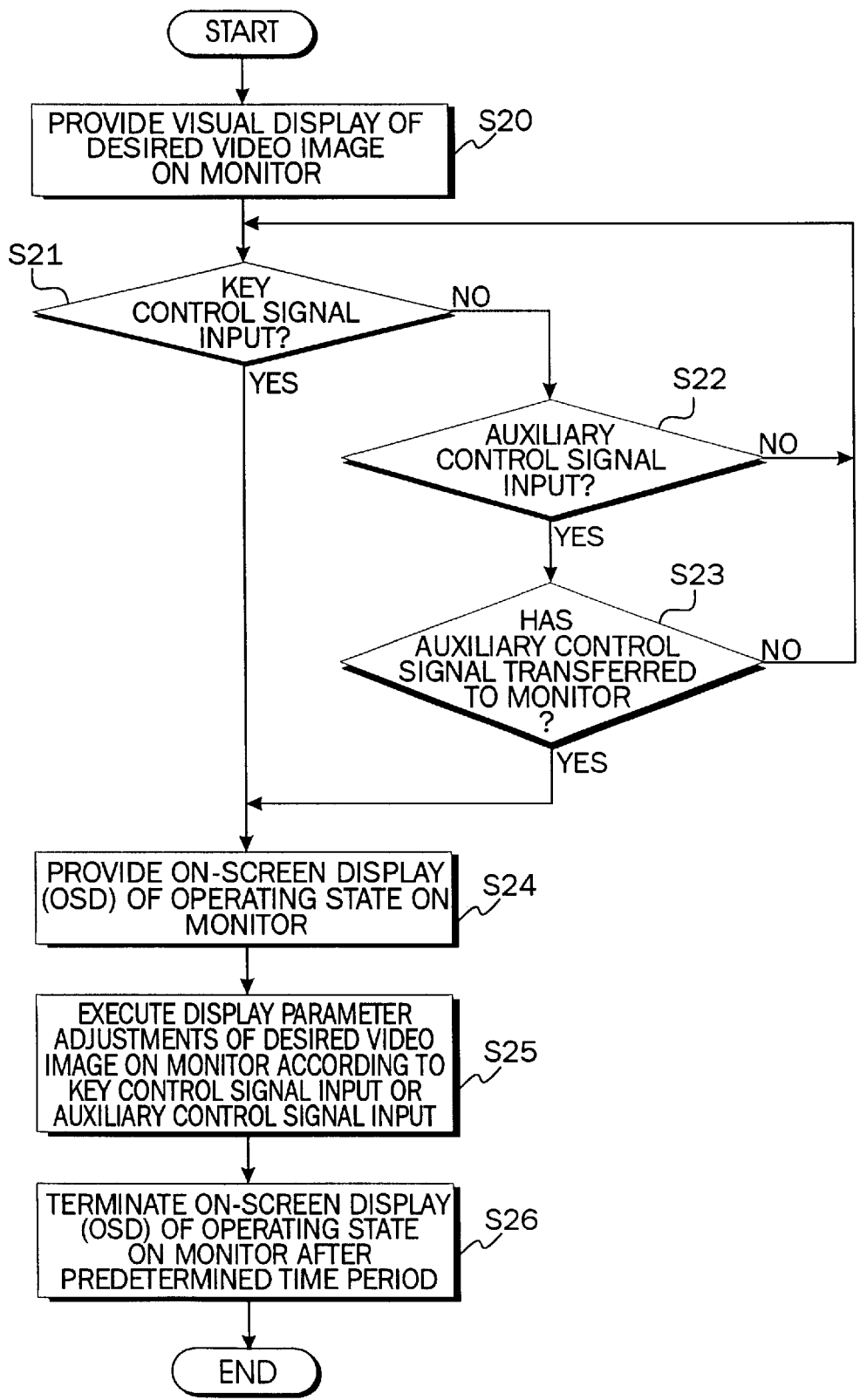
FIG. 2 is a flowchart of a method for controlling an OSD operation of the display apparatus according to the principles of the present invention.

Now, the operation of the display apparatus for an on-screen display (OSD) of an operating state of the display apparatus will be described in detail with reference to FIGS. 1 and 2 hereinbelow.

First, at step S20, the video pre-amplifier 11 amplifies a video signal from the video input terminal 10 by a predetermined level and the video output unit 12 outputs the video signal amplified by the video pre-amplifier 11 to the CRT 13. The MCU 14 then applies vertical and horizontal synchronous signals from the video input terminal 10 to the vertical and horizontal drivers 18 and 19, respectively, to drive the vertical and horizontal deflection yokes V-DY and H-DY. As a result, a desired video image is displayed on the CRT monitor 13.

Then, at step S21, the MCU 14 determines whether a key control signal is input through the key input unit 15 by the user to adjust the display parameters of a video image displayed on the CRT monitor 13 such as contrast, brightness, picture position. If no key control signal is input through the key input unit 15 at step S21, the MCU 14 determines next whether an auxiliary control signal from the USB unit is input through the auxiliary input/output terminal 16 at step S22. If the auxiliary control signal from the USB unit is input through the auxiliary input/output terminal 16 at step S22, the MCU 14 determines whether the input auxiliary control signal is to be transferred to the CRT monitor 13 at step S23.

When either the key control signal is input through the key input unit 15 at step S21 or the auxiliary control signal is input through the auxiliary input/output terminal 16 at step S22 and then transferred to the CRT monitor 13 at step S23, the MCU 14 controls the OSD unit 17 to provide an on-screen display (OSD) of an operating state of the display apparatus on the CRT monitor 13 at step S24. Then, the MCU 14 executes the display parameter adjustments such as brightness adjustment, horizontal/vertical size adjustment and horizontal/vertical position adjustment in accordance with one of the key control signal input and the auxiliary control signal input at step S25. Thereafter, when a predetermined time period has elapsed, the MCU 14 controls the OSD unit 17 at step S26 to terminate the on-screen display (OSD) of the operating state of the display apparatus on the CRT monitor 13.

On the other hand, if no auxiliary control signal from the USB unit is input through the auxiliary input/output terminal 16 or no auxiliary control signal is transferred to the CRT monitor 13, the MCU 14 returns to step S21 to monitor for input of a next key input signal from the key input unit 15.

As apparent from the above description, according to the present invention, when the display apparatus is controlled in response to a control signal which is applied to the auxiliary input/output terminal through the USB unit, as well as a control signal which is applied through the self key input unit, the controlled operating state is displayed on the screen in the OSD manner. Therefore, the user can immediately check the current operating state of the display apparatus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling an on-screen display operation of a monitor having an auxiliary input/output terminal, comprising the steps of:
   providing a visual display of a desired video image on said monitor;
   determining whether a key control signal is input through a key input unit installed on said monitor for adjustment of display parameters of said desired video image displayed on said monitor;
   when no key control signal is input through said key input unit, determining whether an auxiliary control signal is input through said auxiliary input/output terminal;
   when said auxiliary control signal is input through said auxiliary input/output terminal, determining whether the input auxiliary control signal is to be transferred to said monitor for adjustment of the display parameters of said desired video image displayed on said monitor; and
   providing an on-screen display of an operating state of display parameters on said monitor, and executing display parameter adjustments of said desired video image displayed on said monitor in accordance with the input one of the input key control signal and the input auxiliary control signal.

2. The method of claim 1, further comprised of the auxiliary control signal being applied to said auxiliary input/output terminal through a universal serial bus connected to a host computer.

3. The method of claim 1, further comprised of automatically terminating the on-screen display of the operating state of the display parameters of said desired video image displayed on said monitor after a predetermined time period.

4. The method of claim 1, further comprised of said key control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said desired video image displayed on said monitor.

5. The method of claim 4, further comprised of said auxiliary control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said desired video image displayed on said monitor.

6. The method of claim 5, further comprised of automatically terminating the on-screen display of the operating state of the display parameters of said desired video image displayed on said monitor after a predetermined time period.

7. A monitor, comprising:
   said monitor for providing a visual display of a video image;
   a key input unit installed on said monitor and comprising a plurality of control inputs for permitting a user to adjust display parameters of said video image displayed on said monitor and generating a key control signal indicating an image adjustment request from the user;
   an auxiliary input/output unit installed on said monitor and connected to a host computer via an universal serial bus, for receiving an auxiliary control signal from said host computer to adjust the display parameters of said video image displayed on said monitor; and
   a controller for controlling the visual display of said video image on said monitor, controlling an on-screen display of an operating state of display parameters of said video image displayed on said monitor, and executing display parameter adjustments of said video image displayed on said monitor in response to receipt of one of the key control signal and the auxiliary control signal.

8. The monitor of claim 7, further comprised of said controller automatically terminating the on-screen display of the operating state of the display parameters of said video image displayed on said monitor after a predetermined time period.

9. The monitor of claim 7, further comprised of said key control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said video image displayed on said monitor.

10. The monitor of claim 9, further comprised of said auxiliary control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said video image displayed on said monitor.

11. The monitor of claim 10, further comprised of said controller automatically terminating the on-screen display of the operating state of the display parameters of said video image displayed on said monitor after a predetermined time period.

12. The monitor of claim 10, further comprised of said controller further:
   determining whether said key control signal is input through said key input unit for adjustment of display parameters of said desired video image displayed on said monitor;
   when no key control signal is input through said key input unit, determining whether said auxiliary control signal is input through said auxiliary input/output terminal; and
   when said auxiliary control signal is input through said auxiliary input/output terminal, determining whether the input auxiliary control signal is to be transferred to said monitor for adjustment of the display parameters of said video image displayed on said monitor before providing said on-screen display of said operating state of display parameters of said video image displayed on said monitor.

13. The monitor of claim 12, further comprised of said controller automatically terminating the on-screen display of the operating state of the display parameters of said video image displayed on said monitor after a predetermined time period.

14. A method for controlling an on-screen display of display parameters of a video image displayed on a monitor, comprising the steps of:
   providing a visual display of a video image on said monitor, said monitor having a key input unit installed on said monitor with a plurality of control inputs, and an auxiliary input/output terminal installed on said monitor and connected to a host computer via an universal serial bus;

determining whether a key control signal is input through said key input unit installed on said monitor for adjustment of display parameters of said video image displayed on said monitor;

when no key control signal is input through said key input unit, determining whether an auxiliary control signal is input through said auxiliary input/output terminal;

when said auxiliary control signal is input through said auxiliary input/output terminal, determining whether the input auxiliary control signal is to be transferred to said monitor for adjustment of the display parameters of said video image displayed on said monitor; and providing an on-screen display of an operating state of display parameters on said monitor, and executing display parameter adjustments of said desired video image displayed on said monitor in accordance with one of the input key control signal and the input auxiliary control signal.

15. The method of claim 14, further comprised of automatically terminating the on-screen display of the operating state of the display parameters of said video image displayed on said monitor after a predetermined time period.

16. The method of claim 14, further comprised of said key control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said video image displayed on said monitor.

17. The method of claim 16, further comprised of said auxiliary control signal corresponding to an adjustment request for adjusting selected ones of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain of said video image displayed on said monitor.

18. The method of claim 17, further comprised of automatically terminating the on-screen display of the operating state of the display parameters of said video image displayed on said monitor after a predetermined time period.

* * * * *